United States Patent Office 2,973,932
Patented Mar. 7, 1961

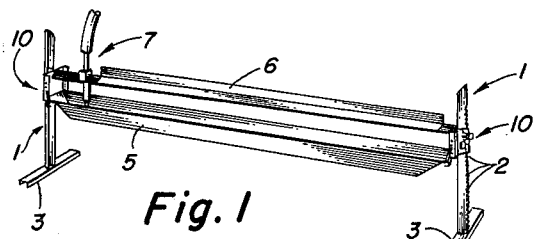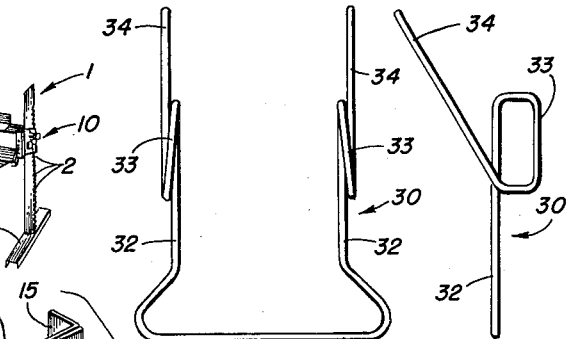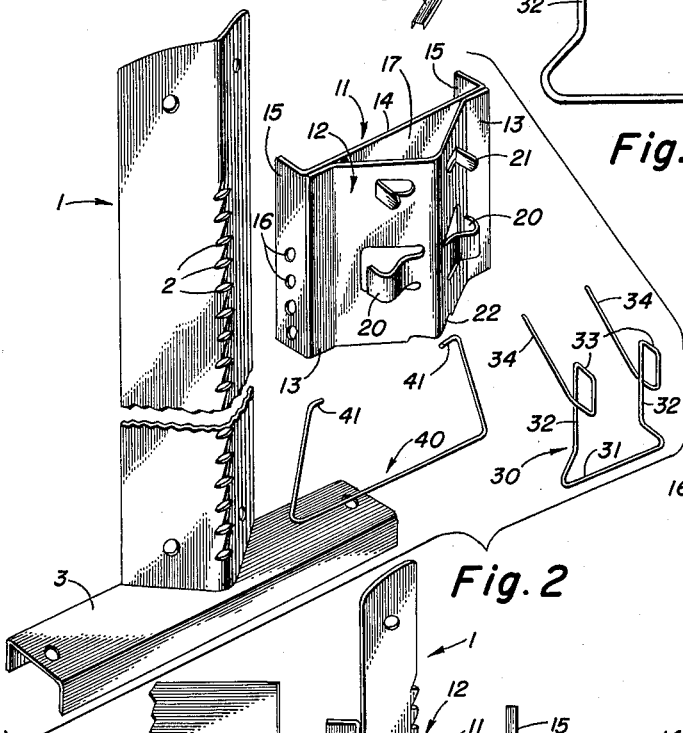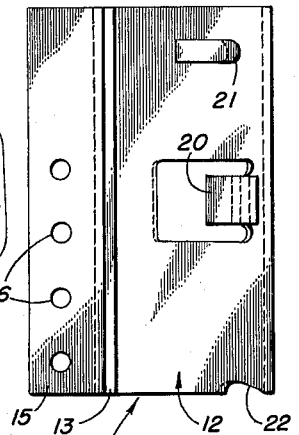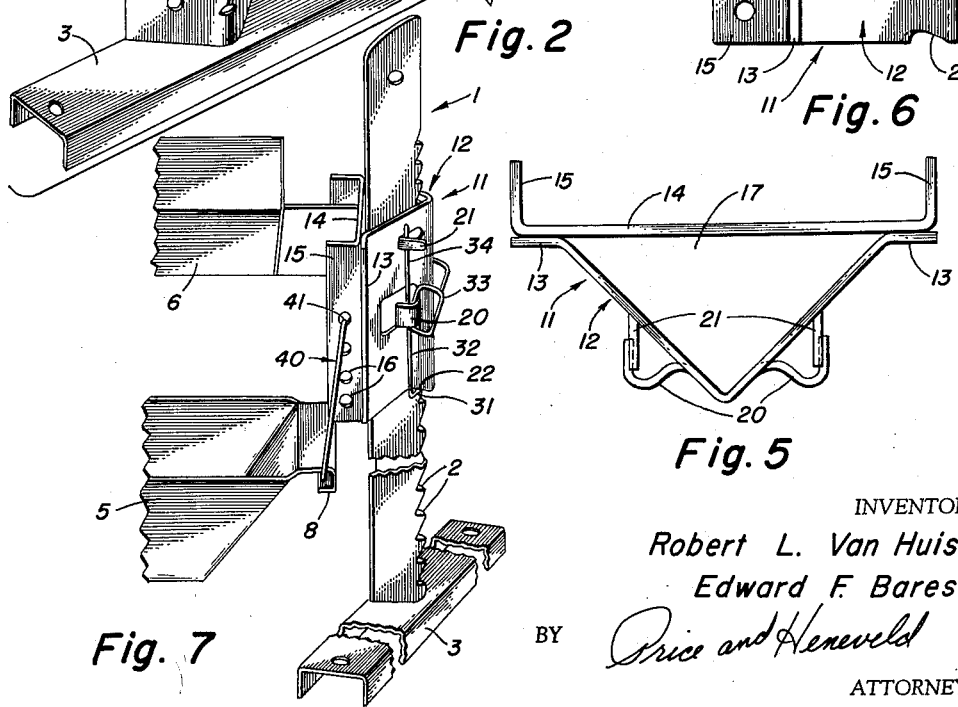

2,973,932

NOTCHED LEG SUPPORT

Robert L. Van Huis, Holland, and Edward F. Bares, Grand Haven, Mich., assignors to Automatic Poultry Feeder Company, Zeeland, Mich., a corporation of Michigan Filed Sept. 24, 1959, Ser. No. 842,029

7 Claims. (Cl. 248—125)

This invention relates to a notched leg support. More particularly, this invention relates to a notched leg support especially adapted to be used in conjunction with chicken waterers or feeders, the support being easily adjustable in height.

Many types of chicken waterers and feeders are in existence which comprise a trough suspended between two supports. Normally, a guard is provided above the trough to enable the chickens to have access to the trough only with their head and neck, and preventing them from standing or sitting in the trough. When such waterers and feeders are provided for baby chickens, they must constantly be adjusted as the chickens grow. First of all, the chickens grow in height quite quickly, necessitating the raising of the height of the trough. Secondly, the size of the chicken increases so that the guard must be positioned further above the trough to enable the chicken to get its head into it. This requires many adjustments, the adjustments usually being made when the trough is full of food or water. Supports presently in existence have not been such that they are easily adjustable, especially under these conditions.

Waterers and feeders of this type must be cleaned very often. The only way the trough can be cleaned is to separate it from the guard above it so that the old contents are removed and one is able to wipe the trough clean. Cleaning also requires the type of trough support which allows one to quickly and simply disengage the trough from the support and the guard. It is therefore an object of this invention to provide an adjustable leg support which allows the feeder or waterer to be cleaned quickly and simply.

Another object of this invention is to provide such a leg support which is easily adjustable in height.

Another object of this invention is to provide such a leg support which allows for both easy adjustment of the trough from the ground and easy adjustment of the space between the trough and the guard.

Another object of this invention is to provide such a leg support which is sure and positive in functioning.

Still another object of this invention is to provide such a leg support which allows these adjustments to be made in an absolute minimum of time as well as being simple enough for anyone to quickly operate.

These and other objects of this invention will become obvious to those skilled in the support art upon reading the following specification in conjunction with the accompanying drawings, wherein:

Fig. 1 is a perspective view of a chicken waterer, showing one of the uses to which the support comprising this invention can be put.

Fig. 2 is an exploded, perspective view of the parts comprising this adjustable notched leg support.

Fig. 3 is a plan view of the resilient member which holds the support in place.

Fig. 4 is a side view of the resilient member shown in Fig. 3.

Fig. 5 is a top view of the bracket utilized in this support.

Fig. 6 is a side view of the bracket shown in Fig. 5.

Fig. 7 is a side view of the assembled, adjustable notched leg support, supporting a trough and guard.

Briefly, this invention relates to an adjustable notched leg support, comprising an upstanding leg having a plurality of notches therein, a bracket vertically slidable on the leg, support means on the bracket, resilient means secured to the bracket and the resilient means being normally biased between a pair of notches in the leg. This resilient means is comprised of a generally U-shaped resilient wire member having a spring tensioned coil in each leg. A pair of fingers extending from the face of the bracket extend through these coils, and a pair of ears extending from the bracket above the fingers hold the tops of the legs. The bight portion of this U-shaped member is thus held to the bracket and is biased between a pair of the notches. The height of the support is increased by simply moving the bracket upwardly, the bight portion of the U-shaped member merely sliding over the notches. The support may be lowered by withdrawal of this bight portion from the notched leg whereby the bracket is free to fall downwardly.

Referring more specifically to the drawings, the reference numeral 1 designates an upstanding leg of generally triangular cross section, having a plurality of notches 2 along one vertical edge thereof. These notches 2 preferably are inclined upwardly along one side thereof, the other side being generally horizontal (Figs. 2 and 7). The upstanding leg 1 is mounted on the base 3. The adjustable support 10 is slidably mounted on the upstanding leg 1. Fig. 1 of the drawings shows this adjustable support 10 supporting a trough 5 and a guard 6. It is to be understood that the drawings show one of the many ways in which this adjustable support can be utilized. The trough 5 is adapted to be filled with water, and automatic means 7 being provided to supply water to the trough. This however is not part of the present invention.

The support means 10 includes a bracket 11, a generally U-shaped resilient member 30 and a hanger 40.

Bracket 11 includes the V-shaped plate 12, having a pair of flanges 13 in a common plane (Figs. 2, 5 and 6). Secured to the flanges 13 is the plate 14 having a pair of flanges 15 extending at right angles from a pair of its sides. The plate 14 is secured to flanges 13 by suitable means such as welding, positioned such that the flanges 15 extend at right angles from the longitudinal edges of the V-shaped plate. A plurality of corresponding holes 16 are positioned in the flanges 15, the purpose of which will be explained hereinafter. It will now be obvious that securing the V-shaped plate 12 and plate 14 together in this manner forms a cavity 17 which is generally triangular in cross section as is the upstanding leg 1. This enables the leg 1 to be slidably enveloped by the bracket 11.

A pair of fingers 20 extend from the V-shaped plate 12 of bracket 11, one finger extending from each side thereof in a plane generally parallel to the flanges 13 of the V-shaped plate 12 of bracket 11, one ear 21 extending from each side thereof, lying above the fingers 20 and extending in a plane generally parallel to the flanges 15 of plate 14. At the bottom, outer edge of the V-shaped plate 12 of bracket 11, a protruding lip or hook 22 is formed.

The generally U-shaped resilient member 30 is preferably formed of resilient wire (Figs. 3 and 4). The member 30 includes a bight portion 31, a pair of legs 32 and a spring tensioned coil 33 in each of the legs 32. As shown most clearly in Fig. 4, the upper portions 34 of legs 32 extend at an angle from the main body of the legs 32.

This is accomplished by bending the legs somewhat less than 360° when forming the coils 33 therein, and it will now be obvious that if the upper portions 34 of legs 32 are forced to lie generally in the same plane as the main body of the legs, spring tension will be created.

The hanger 40 (Fig. 2) is preferably a generally U-shaped, resilient wire member having inturned portions 41 at the upper ends of its legs. These portions 41 are adapted to fit in a corresponding pair of holes in the flanges 15 of bracket 11.

*Assembly and operation*

The adjustable notched leg support comprising this invention is assembled as follows. The bracket 11 slidably envelops the upstanding leg 1, the leg 1 sliding through the cavity 17 (Figs. 2 and 7). The resilient U-shaped member 30 is then secured to the bracket 11 as follows. The bight portion 31 of the member 30 is placed below the lip 22 of bracket 11, the upper portions 34 of legs 32 placed between the ears 21 extending from bracket 11. The spring tensioned coils 33 in the legs 32 are then forced inwardly towards the V-shaped plate 12, until the fingers 20 can be extended through the coils 33 (Fig. 7). It will now be noted that the bight portion 31 of the resilient U-shaped member 30 is biased between a pair of notches 2 and against the upstanding leg 1. The hanger 40 is then secured to the flanges 15 at the back of the bracket 11 by placing the inturned portions 41 into a corresponding pair of holes 16 in the flanges. The hanger 40 thus depends downwardly from the back of the bracket 11.

Thus assembled, this adjustable notched leg support is operated and functions as follows. The guard 6 may be secured to the back of bracket 11 by any suitable means, Fig. 7 showing it welded thereto. The trough 5 may then be hung on the hanger 40. Fig. 7 shows the trough 5 and the guard 6 being in the closest proximity possible with this arrangement. It will be noted that as the inturned portions 41 of hanger 40 are moved into a lower pair of corresponding holes 16 in flanges 15 of bracket 11, the guard and trough will be spaced further apart. This is very easily accomplished by pulling the legs of the hanger 40 apart, the wire being sufficiently resilient to snap back into another pair of corresponding holes 16. It will also be noted that one could very simply lower the trough 5 all the way to the ground in the same manner. Also, with this hanger arrangement, one could remove the lip 8 of the trough 5 from the hanger 40 and lower the trough to the ground. Thus, an extremely easy and expedient means has been provided for adjusting the distance between the trough 5 and the guard 6. Further, an extremely simple and expedient means has been provided for lowering the trough 5 to the ground for purposes of cleaning.

The height of the trough 5 and guard 6 above the ground is determined by the height of the bracket 11. The bracket 11 may be raised or lowered as follows. To raise the bracket, one need merely lift it upwardly along the upstanding leg 1. The bight portion 31 of the member 30 merely slides over the notches 2, and when the bracket 11 has been raised to the proper height the resiliency of the member 30 will force the bight portion 31 between a pair of notches. The lip 22 of the bracket 11 protrudes beyond the bight portion 31 and thus the bracket 11 is prevented from moving downwardly. In this position the weight of the bracket and trough causes the bight portion to bend slightly and engage the lip 22. The hooked or arcuate shape of the lip 22 prevents the spring from accidentally being forced out of the notch 2 which locks the bracket in place.

To lower the bracket, one need merely slightly lift the bracket 11 causing the bight portion 31 to flex out of engagement with the lip 22. The bight portion 31 of the resilient U-shaped member is then grasped, drawn away from the leg 1 permitting the bracket 11 to drop downwardly. When the proper height has been determined, release of the bight portion 31 will bias it between another pair of notches. Thus, the raising or lowering of the bracket 11 is extremely simple, anyone being able to raise or lower it. Further, it is non time consuming which is of course important in instances where baby chicks are growing fast and a great number of feeding and watering troughs have to continuously be raised.

An adjustable notched leg support has been disclosed which is simple and non time consuming in operation. Very fine adjustments can be made. Means has been provided whereby the height of the trough may be raised or lowered or the distance between the trough and the guard may be changed. The support is so simple in operation that anyone can quickly adjust it. The parts are not complicated and not subject to wear, necessitating costly repairs.

While certain other embodiments might be utilized in practicing this invention, all of these embodiments are to be included within the spirit and scope of the invention unless the following claims specifically state otherwise.

We claim:

1. An adjustable notched leg support, comprising: an upstanding leg; a plurality of notches in said leg; a bracket vertically slidable on said leg; support means on said bracket; a generally U-shaped member secured to said bracket; each leg of said member including a spring tensioned coil therein; and the bight portion of said member extending below said bracket, said coils normally biasing said bight portion between said notches.

2. An adjustable notched leg support, comprising: an upstanding leg; a plurality of notches in said leg; a bracket vertically slidable on said leg; support means on said bracket; a pair of horizontally spaced fingers extending from said bracket; a pair of horizontally spaced ears extending from said bracket above said fingers; a generally U-shaped member secured to said bracket, each leg of said member including a spring tensioned coil therein, the legs of said member locked between said ears and said fingers extending through said coils; and the bight portion of said member extending below said bracket, said coils normally biasing said bight portion between said notches.

3. An adjustable notched leg support, comprising: an upstanding leg; a plurality of notches in said leg; a bracket slidably enveloping said leg; support means on said bracket; a pair of horizontally spaced fingers extending from said bracket; a pair of horizontally spaced ears extending from said bracket above said fingers; a generally U-shaped wire member secured to said bracket, each leg of said member including a spring tensioned coil therein, the legs of said member locked between said ears and said fingers extending through said coils; and the bight portion of said member extending below said bracket, said coils normally biasing said bight portion between said notches.

4. An adjustable notched leg support as defined in claim 3, said support means comprising a pair of vertical flanges on the side of said bracket opposite from said ears and said fingers, a plurality of corresponding holes in said flanges and a hanger removably positioned in a pair of said corresponding holes.

5. An adjustable notched leg support, comprising: an upstanding leg; a plurality of notches in said leg; a bracket slidably enveloping said leg, said bracket including a pair of ears and a pair of fingers and a lower lip extending from one side thereof, a pair of vertical flanges extending from the side opposite said one side and a plurality of holes in each of said flanges; a generally U-shaped wire member cooperating with said bracket, each leg of said member including a spring tensioned coil therein; said fingers of said bracket extending through said coils of said member and said legs of said member held behind said ears of said bracket whereby the bight portion of said U-shaped member extends below said lip of said bracket and is biased against said leg and between two of said notches; and a depending wire support removably positioned in a corresponding pair of said holes in said flanges, the height of said support increased by moving said bracket upwardly, said bight portion of said member sliding over said notches and said support lowered by withdrawal of said bight portion from said leg whereby said bracket is free to move downwardly.

6. An adjustable notched leg support, comprising: an upstanding leg; a plurality of notches in said leg; a bracket slidably enveloping said leg, said bracket including a pair of ears and a pair of fingers and a lower lip extending from one side thereof, a pair of vertical flanges extending from the side opposite said one side and a plurality of holes in each of said flanges; a generally U-shaped wire member cooperating with said bracket, each leg of said member including a spring tensioned coil therein; said fingers of said bracket extending through said coils of said member and said legs of said member held behind said ears of said bracket whereby the bight portion of said U-shaped member extends below said lip of said bracket and is biased against said leg and between two of said notches, said bight portion bending when in its position of support and extending under said lip; and a depending wire support removably positioned in a corresponding pair of said holes in said flanges, the height of said support increased by moving said bracket upwardly, said bight portion of said member sliding over said notches and said support lowered by withdrawal of said bight portion from said leg whereby said bracket is free to move downwardly.

7. An adjustable notched leg support, comprising: an upstanding leg; a plurality of notches in said leg; a bracket vertically slidable on said leg; support means on said bracket; resilient means secured to said bracket, said resilient means comprising a generally U-shaped member having a bight portion extending below said bracket; and said bight portion of said resilient means normally biased between said notches in said leg.

References Cited in the file of this patent
UNITED STATES PATENTS

| | | |
|---|---|---|
| 940,875 | Hetherington | Nov. 23, 1909 |
| 2,743,903 | Lucker | May 1, 1956 |